United States Patent
Hayes et al.

(10) Patent No.: US 11,595,821 B2
(45) Date of Patent: Feb. 28, 2023

(54) WIRELESS PLC ATTACK MITIGATION

(71) Applicant: Bendix Commercial Vehicle Systems LLC, Elyria, OH (US)

(72) Inventors: Thomas J. Hayes, Lakewood, OH (US); Benjamin L. Gardiner, Arnprior (CA)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 171 days.

(21) Appl. No.: 17/183,823

(22) Filed: Feb. 24, 2021

(65) Prior Publication Data

US 2022/0272540 A1 Aug. 25, 2022

(51) Int. Cl.
| | |
|---|---|
| *H04L 29/06* | (2006.01) |
| *H04L 29/08* | (2006.01) |
| *H04W 12/122* | (2021.01) |
| *H04W 4/48* | (2018.01) |
| *H04W 12/128* | (2021.01) |
| *H04W 12/125* | (2021.01) |
| *H04L 29/12* | (2006.01) |

(52) U.S. Cl.
CPC ............ *H04W 12/122* (2021.01); *H04W 4/48* (2018.02); *H04W 12/125* (2021.01); *H04W 12/128* (2021.01)

(58) Field of Classification Search
CPC ............. H04W 12/122; H04W 12/128; H04W 12/125
USPC ........................................................ 726/22
See application file for complete search history.

(56) References Cited

U.S. PATENT DOCUMENTS

| | | | |
|---|---|---|---|
| 5,852,796 A * | 12/1998 | Stepanenko, Jr. | G01R 31/74 702/89 |
| 7,628,760 B2 * | 12/2009 | Semler | A61B 5/14552 600/323 |
| 9,173,100 B2 | 10/2015 | Ricci | |
| 2006/0170285 A1 | 8/2006 | Morimitsu et al. | |
| 2008/0212246 A1 * | 9/2008 | Tanaka | G01R 31/52 324/750.01 |

(Continued)

FOREIGN PATENT DOCUMENTS

| | | | |
|---|---|---|---|
| JP | 2005-278082 A | 10/2005 | |
| KR | 10-1500431 B1 | 3/2015 | |
| TW | 201801957 A * | 1/2018 | .............. B60L 50/50 |

*Primary Examiner* — Haresh N Patel
(74) *Attorney, Agent, or Firm* — Crowell & Moring LLP

(57) ABSTRACT

A device for detecting nefarious communication signals in a vehicle includes a detection support logic, a nefarious logic, a filtering circuit, and a microcontroller. The device receives a measurement signal from the detection support logic. The device determines a characteristic of an alternating current (AC) signal during communication at a first time on a wiring harness of the vehicle based on the measurement signal. The device determines the characteristic of the AC signal at a second time based on the measurement signal. The device determines that the characteristic measured during the first time differs from the characteristic measured during the second time. The device transmits a blocking signal to the nefarious logic to filter a frequency band of a communication conductor of the wiring harness in response to the determination that the characteristic measured during the first time differs from the characteristic measured during the second time.

20 Claims, 8 Drawing Sheets

(56) References Cited

U.S. PATENT DOCUMENTS

| | | | |
|---|---|---|---|
| 2011/0068234 A1* | 3/2011 | Schaety | H02G 3/0481 |
| | | | 248/68.1 |
| 2011/0070405 A1* | 3/2011 | Schaety | H01B 13/085 |
| | | | 428/156 |
| 2011/0072763 A1* | 3/2011 | Schaety | H01B 13/01281 |
| | | | 53/461 |
| 2011/0110009 A1* | 5/2011 | Sugimoto | H03K 17/0822 |
| | | | 361/93.1 |
| 2014/0053260 A1* | 2/2014 | Gupta | G06F 21/50 |
| | | | 726/22 |
| 2014/0150100 A1* | 5/2014 | Gupta | G06F 21/316 |
| | | | 726/22 |
| 2017/0234923 A1* | 8/2017 | Douglas | G01D 3/08 |
| | | | 324/750.3 |
| 2019/0204853 A1* | 7/2019 | Miller, Jr. | G05D 1/0295 |
| 2021/0392419 A1* | 12/2021 | Meister | G02B 6/423 |

* cited by examiner

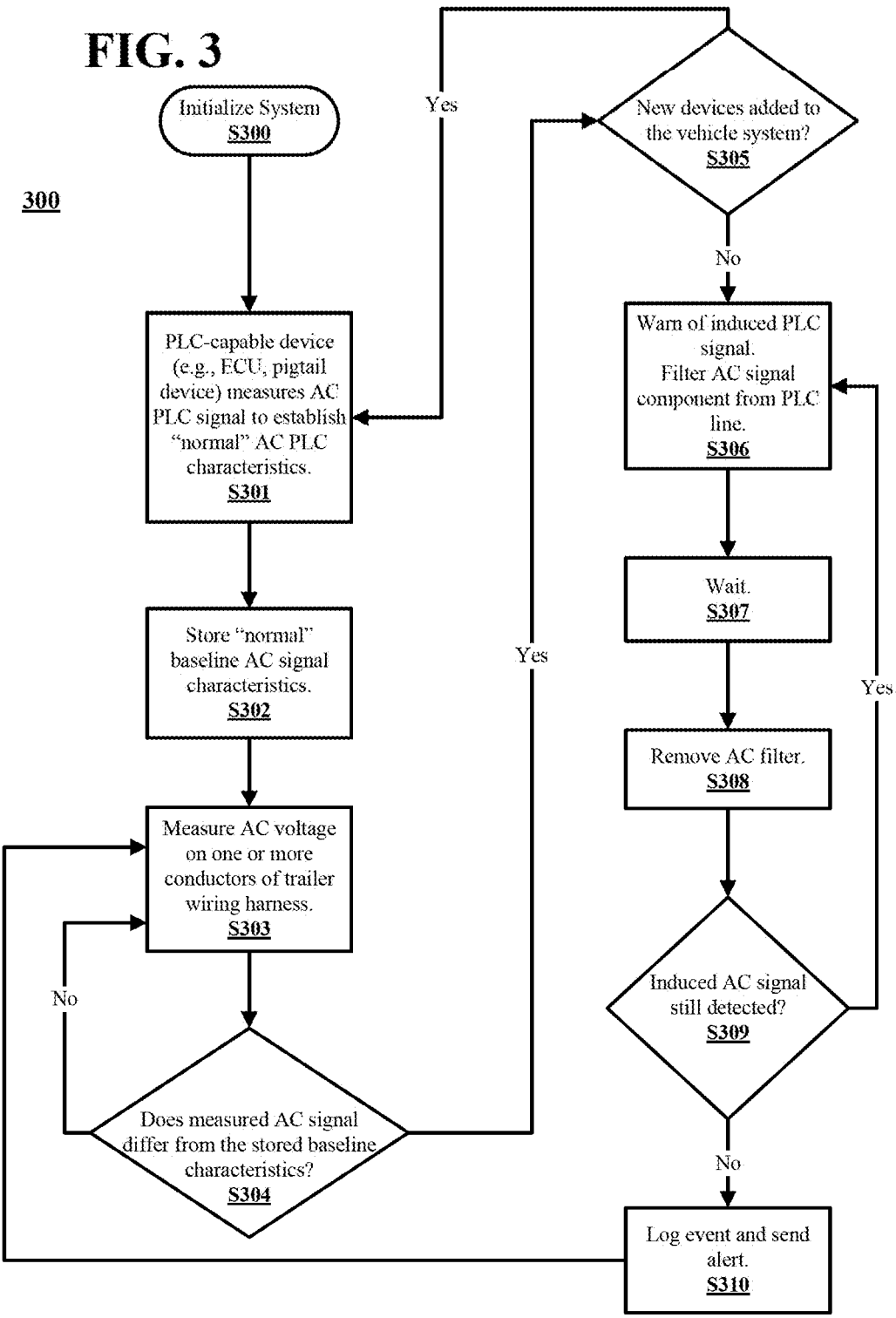

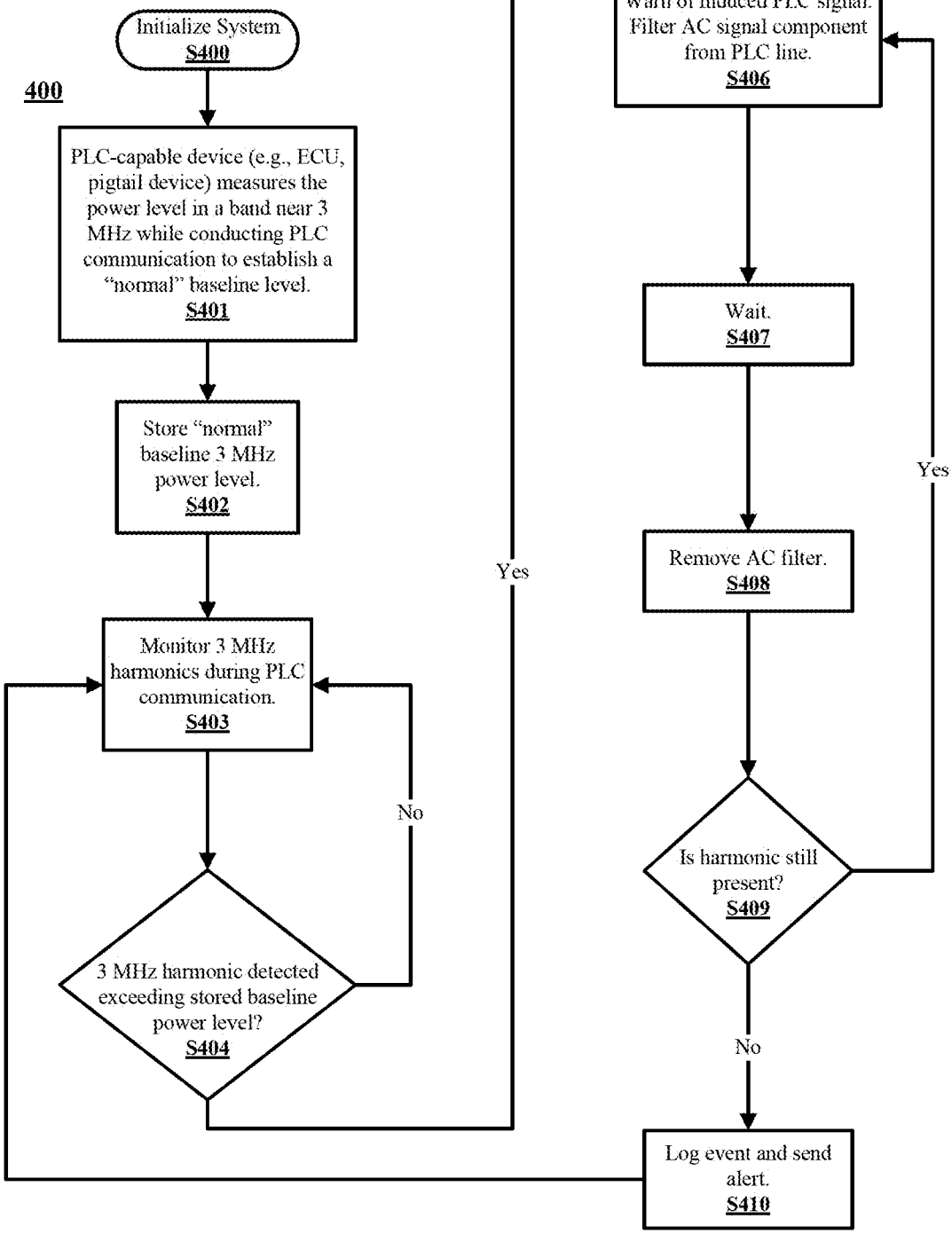

WIRELESS PLC ATTACK MITIGATION

BACKGROUND AND SUMMARY OF THE INVENTION

Modern commercial vehicles may contain various electronic control units (ECUs) that include processors to control various vehicle systems, such as the engine, brakes, transmission, climate controls, safety systems, and the like. The use of ECUs may create exposure to cyber-attacks from nefarious actors, which may find ways to cause the processors to execute unauthorized instructions. The processors may be unable to distinguish the cyber-attack from authentic intra-vehicle data communication and allow infiltration by the nefarious actor. Once the nefarious actor succeeds in communicating with the vehicle ECUs, the associated vehicle systems may cease to perform or perform unpredictably.

The present subject matter may increase a commercial vehicle's resistance to cyber-attacks through the various computer-implemented techniques disclosed herein.

According to an embodiment of the present subject matter, a method of detecting nefarious communication signals in a vehicle includes measuring a characteristic of an alternating current (AC) signal during communication at a first time via a wiring harness of the vehicle. The method further includes measuring the characteristic of the AC signal at a second time. The method further includes determining that the characteristic measured during the first time differs from the characteristic measured during the second time. The method further includes coupling a filtering circuit via a switch to the wiring harness to filter a frequency band of a communication conductor of the wiring harness in response to the determination. The method further includes delivering power to a plurality of electronic components of the vehicle via a direct current (DC) voltage component of a power signal. The method further includes filtering the DC voltage signal component from the power signal to produce the AC signal. The wiring harness is communicably coupled to a plurality of electronic control units (ECUs) of the vehicle. The method further includes generating an audio or visual warning and conveying the warning to a user of the vehicle in response to the determination. A power-line communication (PLC) signal of the vehicle is limited in response to the switching on of the filtering circuit. The characteristic is a power level of a frequency band of the AC signal. The frequency band is a first frequency band. The first frequency band of the AC signal is outside of a second frequency band in which the communication occurs. The characteristic is an amplitude of the AC signal. The amplitude measured at the second time occurs on the wiring harness and is less than the amplitude measured at the first time. The determining the characteristic measured during the first time differs from the characteristic measured during the second time further includes determining that the AC signal is present on a different conductor of the wiring harness during the second time than a conductor of the wiring harness in which the characteristic is measured during the first time. The filtering circuit remains switched on for a calculated interval. The method further includes switching the filtering circuit off upon expiration of the calculated interval.

According to an embodiment of the present subject matter, a device for detecting nefarious communication signals in a vehicle includes a detection support logic, a nefarious logic, a filtering circuit, and a microcontroller. The microcontroller is configured to receive a measurement signal from the detection support logic, determine a characteristic of an alternating current (AC) signal during communication at a first time on a wiring harness of the vehicle based on the measurement signal, determine the characteristic of the AC signal at a second time based on the measurement signal, determine that the characteristic measured during the first time differs from the characteristic measured during the second time, and transmit a blocking signal to the nefarious logic to filter a frequency band of a communication conductor of the wiring harness in response to the determination that the characteristic measured during the first time differs from the characteristic measured during the second time. The device further includes an initial filtering logic to filter a direct current (DC) voltage signal component from a power signal to produce the AC signal. The wiring harness is communicably coupled to a plurality of electronic control units (ECUs) of the vehicle. The microcontroller is further configured to cause an audio or visual warning to be conveyed to a user of the vehicle in response to the determination that the characteristic measured during the first time differs from the characteristic measured during the second time. A power-line communication (PLC) signal of the vehicle is limited in response to the filtering of the nefarious circuit. The characteristic is a power level of a frequency band of the AC signal. The frequency band is a first frequency band and the first frequency band of the AC signal is outside of a second frequency band in which the communication occurs. The characteristic is an amplitude of the AC signal and the amplitude measured at the second time occurs on the wiring harness and is less than the amplitude measured at the first time. The microcontroller is further configured to determine that the AC signal is present on a different conductor of the wiring harness during the second time than a conductor of the wiring harness in which the characteristic is measured during the first time. The nefarious circuit filters the frequency band for a calculated interval. The microcontroller is further configured to transmit an unblocking signal to the nefarious circuit to stop filtering the frequency band upon expiration of the calculated interval.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a flow diagram of an example process to detect a cyber-attack in accordance with an embodiment of the present subject matter.

FIG. 4 is a flow diagram of an example process to detect a cyber-attack in accordance with an embodiment of the present subject matter.

DETAILED DESCRIPTION OF THE DRAWINGS

In the following description of the present subject matter, reference is made to the accompanying figures which form a part thereof, and in which is shown, by way of illustration, exemplary embodiments illustrating the principles of the present subject matter and how it may be practiced. Other embodiments can be utilized to practice the present subject matter and structural and functional changes can be made thereto without departing from the scope of the present subject matter.

Figure 1A:
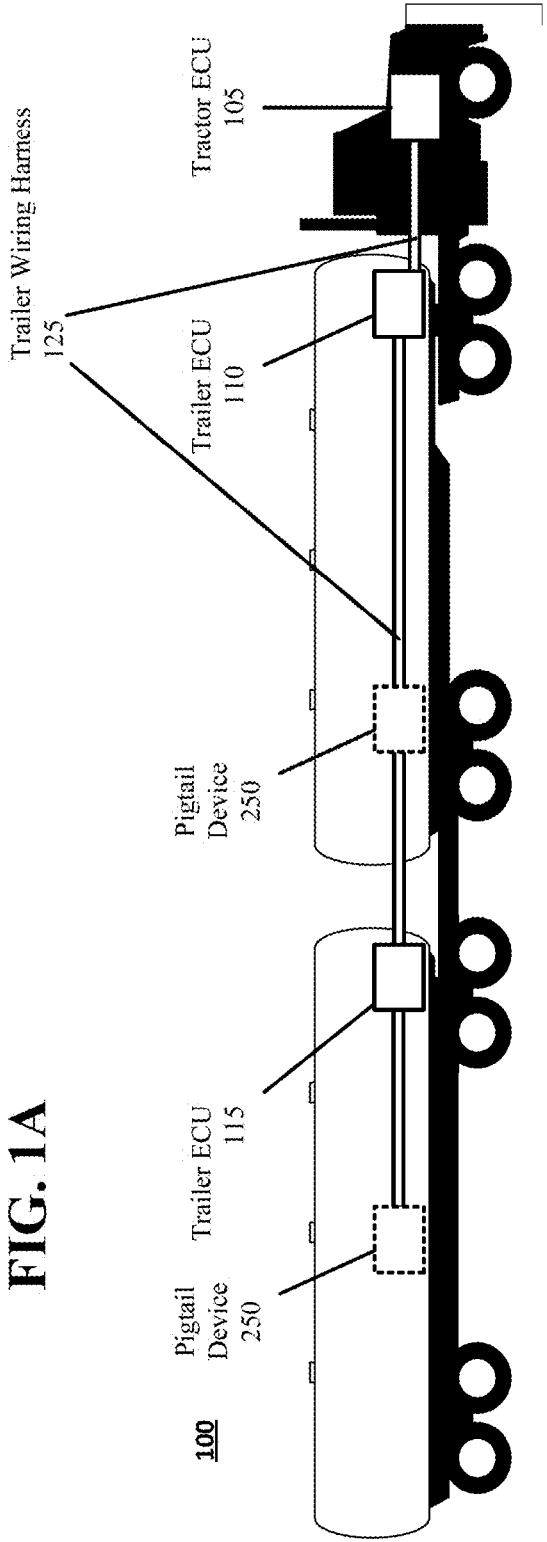
FIG. 1A is an overview diagram of an example commercial vehicle in accordance with an embodiment of the present subject matter.
Figure 1B:
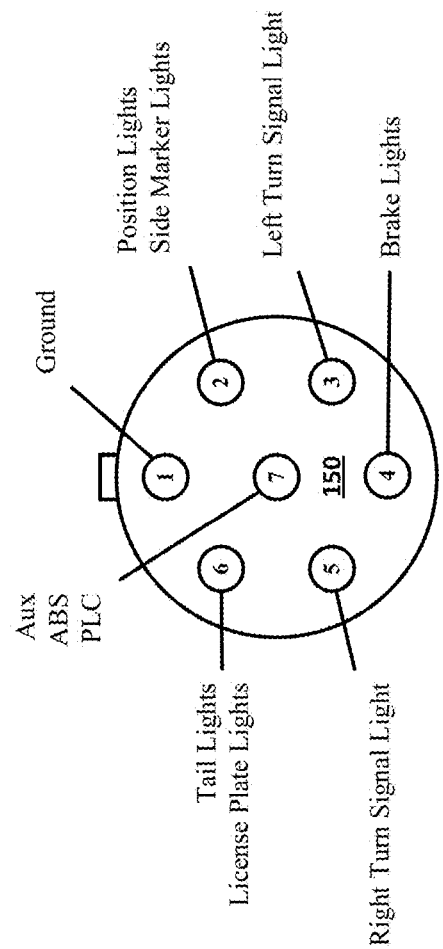
FIG. 1B is a pinout of an example commercial vehicle wiring harness that connects components of the vehicle in accordance with an embodiment of the present subject matter.

FIG. 1A illustrates a commercial vehicle 100 in accordance with the present subject matter. A commercial vehicle, as used herein, may be any large vehicle used for commercial purposes. A commercial vehicle may be, for example, a tractor having one or more trailers, as shown in FIG. 1. As used herein, a commercial vehicle may also be, a vehicle carrier, a semi-truck, a tandem truck, a double bottom truck, a container truck, a flatbed truck, a low boy truck, a bus, a box truck, a ladder truck, a concrete mixer, a boom truck, a dump truck, a garbage truck, a step van, a tow truck, and/or any vehicle with a gross vehicle weight rating (GVWR) exceeding 14,000 pounds (6,351 kilograms).

The commercial vehicle 100 may include one or more electronic control units (ECUs) 105/110/115 that may serve to control various vehicle systems and subsystems. The ECUs 105/110/115 may be implemented using one or more computing devices having one or more of a processor, memory, input/output (I/O), a network interface, non-volatile storage, or the like, as further described with respect to FIG. 6. In an embodiment, commercial vehicle 100 may include a tractor ECU 105 that communicates with and/or controls one or more vehicle systems and/or components of the tractor portion of the commercial vehicle 100. The tractor of commercial vehicle 100 may be propelled by one or more of an internal combustion engine, and/or one or more electric motors. The tractor may be coupled to one or more trailers, such as a semi-trailer and/or a full-trailer, for example. One or more of the trailers may also include an ECU, such as trailer ECU 110 and/or trailer ECU 115, which may communicate with and/or may control one or more vehicle systems and/or components of the respective trailer portion.

The ECUs 105/110/115 may be communicably coupled to one another via a trailer wiring harness 125. In an embodiment, the trailer wiring harness may connect one or more of the ECUs 105/110/115 via one or more of seven conductors, as shown in an example pinout 150 of FIG. 1B. Each of the conductors may be allocated to a unique vehicle function of the commercial vehicle 100. In an embodiment, a first conductor may provide a vehicle ground, a second conductor may be connected to one or more position lights and/or side marker lights, a third conductor may be connected to one or more left turn signal lights, a fourth conductor may be connected to one or more brake lights, a fifth conductor may be connected to one or more right turn signal lights, a sixth conductor may be connected to one or more tail lights and/or license plate lights, and a seventh conductor may be connected to provide auxiliary power, to transmit an anti-lock braking system (ABS) communication signal from one or more antilock brake system(s) of one or more trailer(s), and on which power-line communications (PLC) may be exchanged.

The commercial vehicle 100 may operate on a variety of voltages, such as 12 VDC, 24 VDC, or other voltages, such as voltages that may be present in an electric vehicle or hybrid vehicle, for example. The power provided via the seventh conductor may be in the form of a DC voltage that becomes switched to the seventh conductor when a vehicle key is switched to an "accessory" or "ON" position, a start button is pressed, the commercial vehicle 100 is started or activated, and/or the like. In an embodiment, the seventh conductor, when switched on, may provide a voltage approximately equivalent to the voltage of one or more batteries of the commercial vehicle 100 (e.g., 12 VDC, 24 VDC).

In an example where the commercial vehicle 100 includes an internal combustion engine, the seventh conductor may become switched to provide a DC voltage when the internal combustion engine is started and/or when an "ignition conductor" is activated that enables power to be delivered to the ignition coils, fuel pump, various vehicle sensors, and the like, to become powered. In some commercial vehicles 100, the "ignition conductor," may become activated both when the vehicle is turned ON, the engine is started, and/or a vehicle key is turned to an "ON" position. In electric vehicles, where there may be no true "ignition," an analogous conductor and/or associated accessory circuit may become powered in response to the vehicle being turned on, activated, or awoke from a sleep, hibernate, or suspend state, such as when a driver indicates his or her intent to use the vehicle by unlocking the door(s), moving to within a proximity of the vehicle, transmitting a signal to activate the vehicle via a smartphone or key fob, opening a door or compartment of the commercial vehicle 100, and/or the like.

The PLC communications that may be carried out on the seventh conductor may be used to communicate the ABS communication signal previously described as well as maintenance, fault, and diagnostic information. This information may be transmitted from a trailer ECU 110/115 to the tractor ECU 105, which may respond by alerting a driver of the tractor with a dashboard illumination indication, electronic display indication, LED or other lamp or warning illumination, smartphone alert, playing a sound, and/or other audio or visual indications.

Figure 2A:
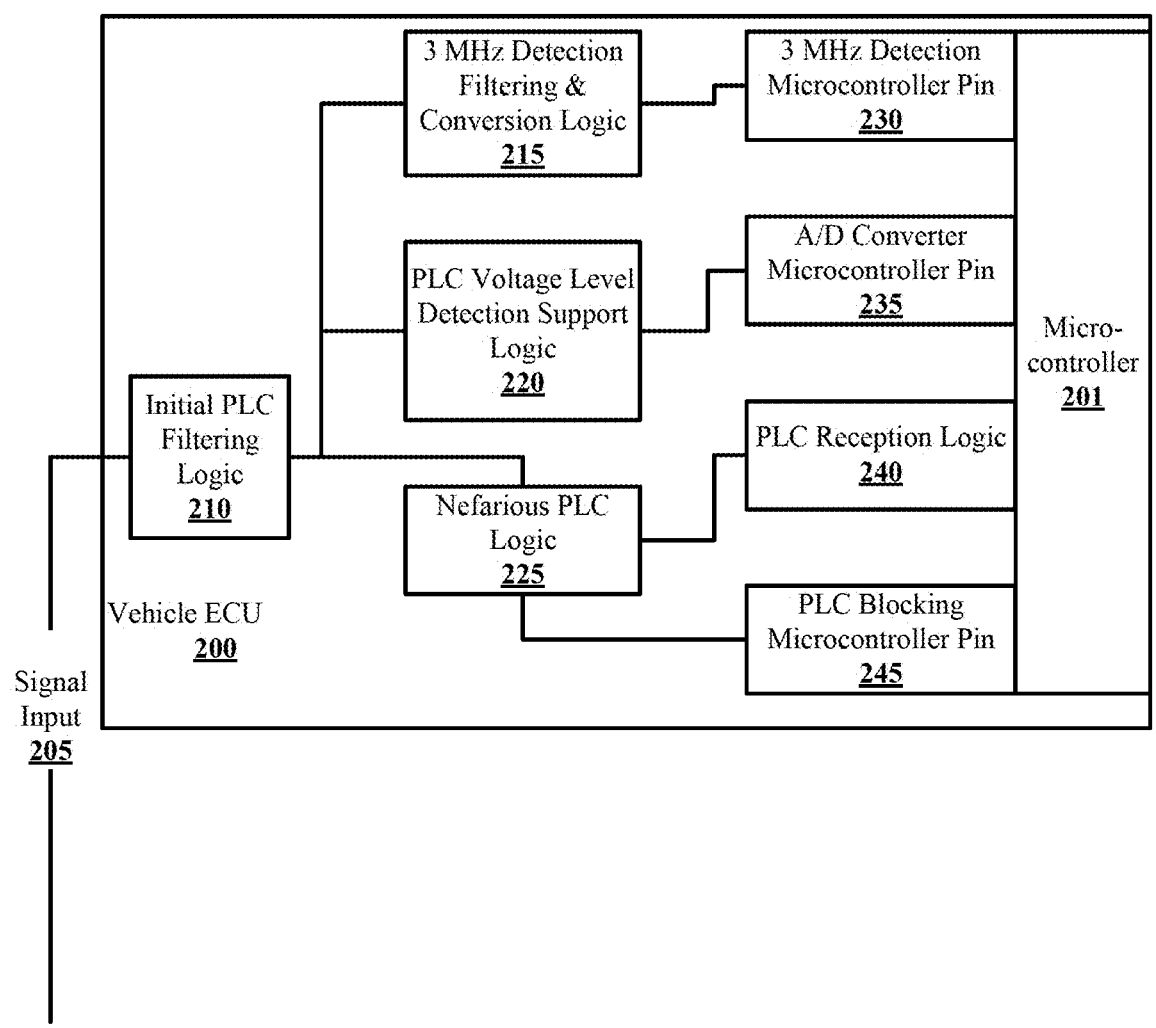
FIG. 2A is a block diagram of an example of a commercial vehicle ECU in accordance with an embodiment of the present subject matter.

FIG. 2A illustrates a vehicle ECU 200 that may be utilized as one or more of the vehicle ECUs 105/110/115. The vehicle ECU 200 may be communicably coupled to a signal input 205, which may be communicably coupled to a conductor of the trailer wiring harness 125 designated for PLC communication (e.g., the seventh conductor), and/or one or more of any other of the conductors previously described in accordance with the pinout 150, such as any of pins 2, 3, 4, 5, 6, and/or 7. In an embodiment, the ECU 200 may include an input selection logic, such as a multiplexer, programmable logic device, microcontroller, ASIC, and the like, to select an input from the plurality of conductors provided in the trailer wiring harness 125 for reception by the initial PLC filtering logic 210. In an embodiment, one or more of the conductors described in accordance with the pinout 150 may be hardwired as inputs to the vehicle ECU 200 such that each conductor being input 205 may be filtered with a corresponding initial PLC filtering logic 210. The PLC filtering logic 210 may remove a DC component of the input signal 205. The removed DC component may correspond to a DC voltage of one or more batteries of the commercial vehicle 100, thus leaving only an AC (alternating current) signal component. In an embodiment, the initial PLC filtering logic 210 may comprise a DC filtering capacitor, high pass filter, bandpass filter, or even a transformer. The remaining AC signal component may represent PLC communication occurring on the conductor of the input signal 205.

The PLC communication may be authentic PLC communication between one or more ECUs 105/110/115 or other vehicle components, systems, and devices coupled to the trailer wiring harness 125, and/or may be fraudulent PLC communication, at least in part, as will be subsequently discussed. The filtered AC signal component may be provided to one or more of a 3 MHz detection filtering and conversion logic 215, a PLC voltage detection support logic 220, and/or a nefarious PLC logic 225. Each of logic blocks 210, 215, 220, and/or 225 may be equivalently implemented using circuits, hardware, firmware or software containing instructions executable using a processor or processing device, and/or combinations of each to perform a function(s) or an action(s), and/or to cause a function or action from another logic, method, and/or system. Logic may include a software-controlled microprocessor, a discrete logic (e.g., logic gates), an analog circuit, a digital circuit, a microcontroller, a programmed logic device (e.g., ASIC, FPGA), a memory device containing instructions, and/or the like.

The vehicle ECU 200 may engage in PLC communication with other ECUs 105/110/115, systems, and devices connected to the trailer wiring harness 225 when the designed PLC communication conductor of the trailer wiring harness 125 (e.g., the seventh conductor) may be input to vehicle ECU 200. As previously described, the initial PLC filtering logic 210 may remove the DC voltage component, leaving only the AC PLC signal component. During normal operation, the AC PLC signal component may pass through the nefarious PLC logic 225 to the PLC reception logic 240 of the microcontroller 201. The PLC reception logic 240 may perform a combination of chirped-amplitude-shift-keying (C-ASK) and chirped-phase-shift-keying (C-PSK) to demodulate and convert the SAE J2497 PLC signals into SAE J1708 frames, and vice versa. The microcontroller 201 may then respond and/or act accordingly based on the received PLC communication processed by the PLC reception logic 240. Microcontroller 201 may be powered via the trailer wiring harness 125.

The trailer wiring harness 125 may extend from the tractor 105, which may be disposed in the tractor area of commercial vehicle 100, to a trailer ECU 115, which may be disposed in one or more trailers in tow. As such, the trailer wiring harness 125 may be of considerable length, including for example, distances greater than 30 feet. Due to this length in addition to the frequencies used in PLC communication, it may be possible to use the conductors of the trailer wiring harness 125 as an antenna and induce fraudulent PLC communication signals for nefarious purposes. The antenna-like properties of the trailer wiring harness 125 may increase as the trailer wiring harness 125 becomes longer, such as through the attachment of additional trailers in the previously-discussed "double bottom" configuration, for example. The efficiency of the trailer wiring harness 125 as an antenna may also increase when it comes to higher order harmonics, which will be subsequently discussed.

A nefarious actor may attempt to induce a PLC signal on one or more conductors of the trailer wiring harness 125, such as a designated conductor in which one or more vehicle ECUs 105/110/115 communicate using PLC. A "nefarious actor" may not be human, and may be a machine or "bot," for example, programmed to carry out cyber-attacks with or without the assistance of a user. In the previously described example trailer wiring harness 125, a targeted conductor may be the seventh conductor, which may provide auxiliary power, as well as the ABS communication signal. Attempts to try to induce a (fraudulent) PLC signal on the trailer wiring harness 125 via wireless broadcast techniques may occur by transmitting a waveform comprising chirped signals in the range of approximately 100 kHz to 400 kHz. In this case, the fraudulent PLC signal may be detectable on one or more of the conductors of the trailer wiring harness 125, including a conductor(s) that the commercial vehicle 100 uses or designates for PLC communication, as well as conductors of the trailer wiring harness 125 not used for PLC communication. In some cases, the fraudulent PLC signal may be detectable on every conductor of the trailer wiring harness 125.

The fraudulent PLC signal induced by a nefarious actor may be detectable by the components and techniques of the present subject matter. In an example, the induced PLC signal may be of a different AC voltage level or other different signal characteristic when compared with intra-vehicle PLC signals originating from PLC-participating components of the commercial vehicle 100. In an example, the fraudulent, induced PLC signals may be of a higher or lower AC voltage level than the authentic PLC signals originating from the commercial vehicle 100.

FIG. 3 is an example process 300 to detect potentially nefarious induced PLC signals and provide filtering and alerts. Process 300 may be performed, for example, via a processor of microcontroller 201. Process 300 may begin when the vehicle's PLC system is initialized in S300. Step S300 may occur when the ignition conductor (or electric vehicle equivalent) becomes switched to provide voltage on a conductor of the trailer wiring harness 125 that has been designated for PLC communication. One or more attached PLC-capable devices, such as ECU 105/110/115 may measure the AC signal characteristics in S301 using the PLC voltage level detection support logic in conjunction with microcontroller 201 to assess a "normal" baseline signal characteristic or acceptable PLC range. One or more AC PLC voltage characteristics may be used and/or combined as desired to provide a basis for assessing whether an AC PLC signal is authentic and originates from the commercial vehicle 100 rather than induced through wireless transmission. In an example, the AC PLC signal characteristic may be the peak-to-peak amplitude of the voltage expressed as a difference between a higher and a lower voltage, an may be an upper and/or lower voltage threshold, an average amplitude, and the like. The baseline AC signal characteristic(s) may be stored in S302 in a memory storage area of microcontroller 201 or other communicably coupled storage device.

As previously discussed, the vehicle ECU 200 may also be selectively coupled or hardwired to non-PLC conductors of the trailer wiring harness 125. In that instance, the PLC voltage level detection support logic 220 in conjunction with the microcontroller 201 may measure the AC signal characteristics in S301 to assess a "normal" baseline induced AC signal characteristic on the non-PLC conductor currently being input. In an example, depending on the external factors such as the length of the trailer wiring harness 125 and whether any shielding or twisting of the conductors is in place, there may be an induced AC PLC signal from the PLC-designated conductor (e.g., the seventh conductor) on one or more of the non-PLC conductors, including the one currently being input (205) due to signal crosstalk, for example. Depending on these factors, the induced AC PLC signal may be relatively large or small. Whether there is or is not an induced AC component on the non-PLC conductor, the baseline AC signal characteristic(s) previously discussed may be stored in a memory storage area of microcontroller 201 or other communicably coupled storage device.

During operation of the commercial vehicle 100, the AC signal characteristic of the conductor coupled into to the PLC voltage level detection support logic 220 may be measured in S303. The measurement may occur periodically at regular intervals, aperiodically at random or irregular intervals, in response to a triggered event, such as a location determined from GPS coordinates where cyber-attacks are historically known to occur based on prior vehicle logs and/or reports, in response to a command input from a driver, in response to a command received via a wirelessly received command from a fleet manager or server, in response to receiving a PLC message, or in response to receiving every $n^{th}$ PLC message, where n may be a predetermined or user-selected parameter. The signal 205 input through the initial PLC filtering logic 210 may be measured by the PLC Voltage Level Detection Support Logic 220. The PLC Voltage Level Detection Support Logic 220 may route signals to and from the A/D Converter Microcontroller Pin 235 to other conductors of the trailer wiring harness 125 to enable measuring AC signals on all conductors. The PLC Voltage Level Detection Support Logic 220 may also provide signal conditioning to place AC signals within an acceptable input voltage range of the A/D Converter Microcontroller Pin 235 when providing the measured result to the microcontroller 201. The microcontroller 201 may convert the analog voltage measurement to a digital representation to perform a comparison between the currently-detected AC signal and the previously stored "normal" baseline AC signal characteristics of the same conductor as in S302.

In S304, it may be determined whether the measured AC signal differs from the stored baseline characteristic. Whether the AC signal differs may depend on the one or more baseline AC signal characteristics stored in S302. For example, where the stored baseline AC signal characteristic is an amplitude of the voltage, it may be determined in S304 whether the measured AC signal differs from the baseline amplitude of the voltage by a minimum predetermined threshold amount. In another example, where the baseline AC signal characteristic stored in S302 is an upper and lower voltage limit, it may be determined in S304 whether the voltage of the measured AC signal exceeds one or both of the upper and lower limits. Where the measured AC signal is determined to be sufficiently different from the stored baseline AC signal characteristics, the process 300 may proceed to S305. In S305, it may be determined whether additional device(s) have been recently added to the trailer wiring harness 125. Additional devices may cause the baseline AC signal characteristics to change from the previously-stored baseline AC signal characteristics of S302. Therefore, if this is the case, as may be determined by reviewing a timestamped list of all participating PLC devices stored in microcontroller 201 with a timestamp when a last baseline AC signal characteristic was stored, the process 300 may return to S301 to re-evaluate the baseline AC signal characteristic(s) of the conductor for which a difference was determined in S304.

Should the determination in S305 be negative, the process 300 may proceed to S306 where it may suspect that a nefarious actor is attempting to induce a fraudulent PLC signal on the trailer wiring harness 125. Microcontroller 201 may transmit PLC signals to cause a warning to be provided to the driver via a dashboard illumination indication, electronic display indication, LED or other lamp or warning illumination, smartphone alert, playing a sound, and/or other audio or visual indications. The microcontroller 201 may transmit the warning before and/or after the filtering is enabled, since PLC communication may be limited, restricted, and/or even completely disabled during filtering. Alternatively, or in addition, the warning may be transmitted from the microcontroller 201 via a wireless signal, such as WiFi, IEEE 802.11, Bluetooth™, and the like. In addition, the current location may be recorded and indexed in a server as a potential cyber-attack hotspot, and may also be transmitted with a report, a vehicle log, ECU log(s), driver and vehicle identification data, and the like, to a vehicle fleet manager, remote user, and/or a back-end server.

In addition, during S306, the microcontroller 201 may take measures to prevent the suspected fraudulent PLC signals from being induced on the trailer wiring harness 125. The microcontroller 201 may transmit a blocking signal, via a PLC blocking microcontroller pin 245, to cause the nefarious PLC logic 225 to terminate all PLC communication transmitted via the designated PLC communication conductor (e.g., the seventh conductor). This may be accomplished by switching an AC filter, such as a low pass filter capacitor or a band stop filter capacitor, to become connected with the designated PLC communication conductor, thus shorting all AC signals on the designated PLC conductor to ground. The switching of the AC filtering capacitor may be implemented by a discrete logic gate, a transistor, a relay, and the like. By using an AC filtering capacitor in this way rather than terminating the PLC designated conductor completely, for example, DC power may still be provided without disruption over the PLC link to provide auxiliary power to connected systems and devices.

In S307, the process 300 may wait for a predetermined time interval. In an embodiment the waiting period of S307 may wait one minute plus one minute multiplied by the number of cycles the AC filtering capacitor has remained switched on; i.e., [1 minute+(1 minute*number_of_cycles)]. For instance, on the first occasion that the AC filtering capacitor of the nefarious PLC logic 225 is switched, the process 300 may wait [1 minute+(1 minute*0 cycles)]=1 minute prior to retrying in step S308, where the AC filter may be removed by switching off the connection between the AC filtering capacitor and ground. In S309, it may determine whether the suspected fraudulently-induced AC signal still exists on the input conductor. If so, the process 300 may return to S306. In the subsequently repeated step S307, the "retry" waiting period may be defined by [1 minute+(1 minute*1 cycle)]=2 minutes, and so on. If it is determined at S309 that the suspected fraudulently-induced AC signal no longer exists, the process 300 may proceed to S310 where the event details, such as the commercial vehicle's current location, a report, a vehicle PLC transaction log, ECU log(s), driver and vehicle identification data, and the like, may be stored in a memory storage of the microcontroller 201 and/or forwarded to a remote user and/or a back-end server.

As previously discussed, a nefarious actor attempting to induce a fraudulent PLC signal on the PLC conductor of the trailer wiring harness 125 may do so by broadcasting a 100 kHz to 400 kHz signal. The nature of amplification of signals in this way during broadcast may cause high frequency harmonics to also be introduced to the receiving antenna. These high frequency harmonic artifacts may be discoverable on one or more conductors of the trailer wiring harness 125. This phenomenon may be particularly true of digital-analog converter (DAC) synthesis systems, which may be the nefarious actor's tool of choice. These high frequency harmonic artifacts, unless attenuated by filters, may reach the multi-MHz range.

Figure 5:
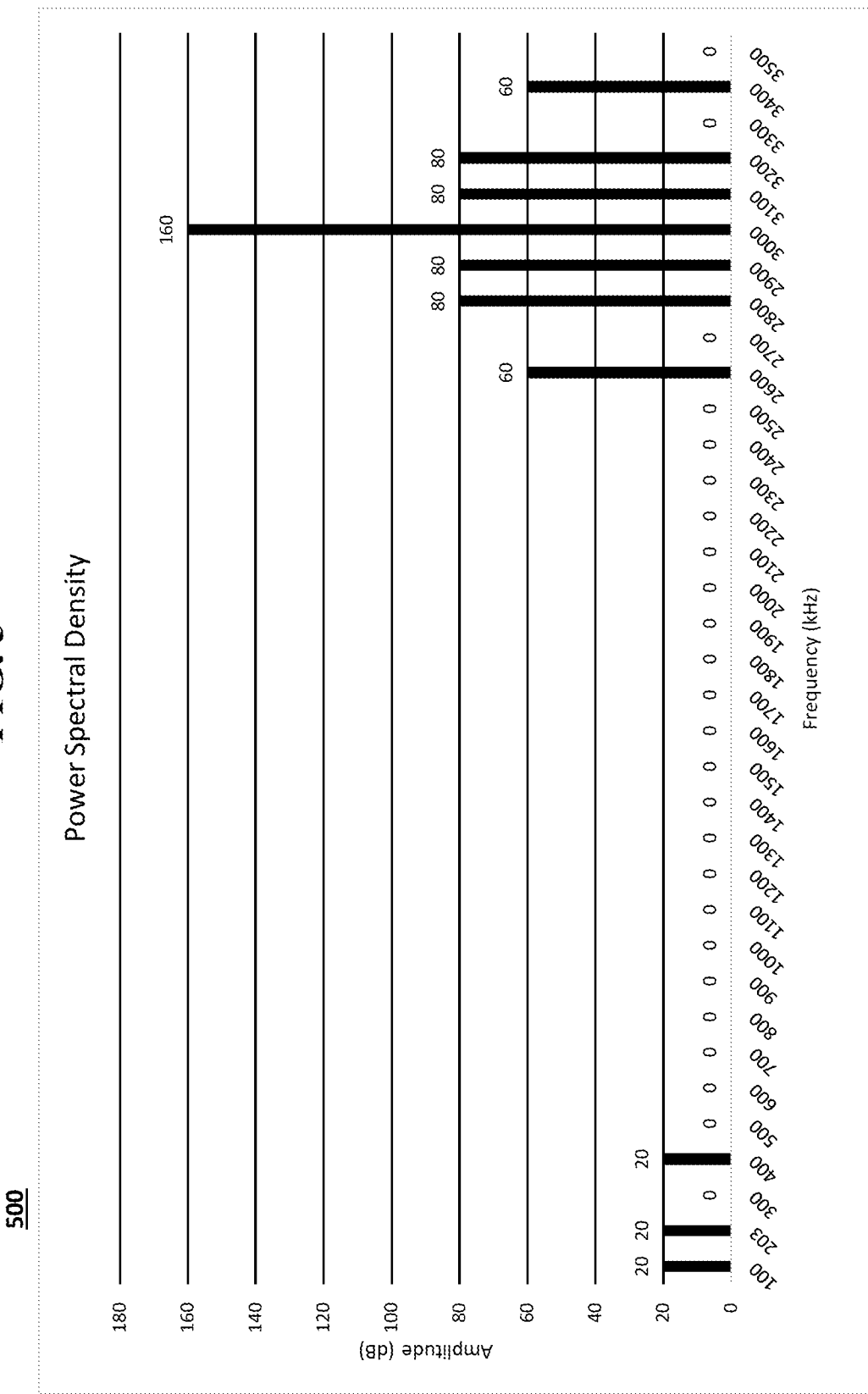
FIG. 5 is a power spectral density graph in the frequency domain of an example nefarious communication received on one or more conductors of a commercial vehicle wiring harness.

The customary lengths of tractor-trailer combinations may be such that the trailers selectively receive harmonics in the alternate frequency more strongly than the target 100-400 kHz PLC signal. An example of this phenomenon may be illustrated in power spectral density graph 500 of FIG. 5. The graph 500 of FIG. 5 shows the frequency domain of an example fraudulently-induced PLC signal having substantially greater strength in about the 3 MHz than the 100-400 kHz band for which PLC communication may be based. During broadcast by the nefarious actor, the high frequency harmonic artifacts may be induced on the vehicle's designated PLC conductor (e.g., the seventh conductor), as well as other conductors of the trailer wiring harness 125, which may not be present during normal PLC communications. Unless the nefarious actor uses more than 160 dB of attenuation for the 3 MHz harmonics, a primary harmonic may occur at 3 MHz. It should be appreciated that the 3 MHz harmonic shown in FIG. 5 is merely an example. Harmonics may be observable at other frequencies or across other frequency bands when a nefarious PLC signal is being induced. For discussion purposes, an example 3 MHz harmonic will be referred to, although harmonics of other frequencies may be readily substituted without departing from the scope of the present subject matter.

Detection of the 3 MHz harmonic may be achieved by performing a power measurement across a frequency band, such as 3 MHz +/−20%, or such as 3 MHz +/−10%. The risk of this approach may be that a spurious detected energy in the 3 MHz frequency may be flagged as a cyber-attack and cause the PLC communication to be limited, restricted, and/or completely disabled via the nefarious PLC logic 225. Alternately, or in addition, a more robust process 400 may be performed in accordance with the present subject matter. Process 400 may be performed, for example, via a processor of microcontroller 201. Process 400 may begin when the vehicle's PLC system is initialized in S400. Step S400 may occur when the ignition conductor (or electric vehicle equivalent) becomes switched to provide voltage on a conductor of the trailer wiring harness 125 that has been designated for PLC communication. In S401, the 3 MHz detection filtering and conversion logic 215 may measure a power level or amplitude within a predetermined range of 3 MHz during authentic, intra-vehicle PLC communication. The predetermined range may be +/−10% or +/−20%, as previously described, such that the frequency band to be measured is 2.7 MHz to 3.3 MHz, or 2.4 MHz to 3.6 MHz, for example. As previously stated, the 3 MHz harmonic is merely an example, and harmonics of other frequencies may be equivalently observed without departing from the scope of the present subject matter. The baseline measured power range may be stored in S402 in a memory storage area of microcontroller 201.

In S403, the 3 MHz detection filtering and conversion logic 215 may monitor 3 MHz harmonic signals on the PLC or non-PLC designated conductor currently being input to the vehicle ECU 200. The monitored 3 MHz harmonic signals may be compared in S404 with the stored baseline power range of S403. In an embodiment, S404 may determine not only whether the power level of the monitored 3 MHz harmonic signal exceeds the stored baseline power range of S403, but also whether the power level of the monitored 3 MHz harmonic signal exceeds the stored baseline power range by at least a predetermined threshold amount. The predetermined threshold amount may be 3 dB, for example. In another example, the predetermined threshold amount may be a percentage amount of the overall power level, such as approximately greater than 1%, greater than 5%, greater than 10%, greater than 15%, greater than 20%, greater than 25%, greater than 30%, greater than 35%, greater than 40%, greater than 450%, greater than 50%, greater than 55%, greater than 60%, greater than 65%, greater than 70%, greater than 75%, greater than 90%, greater than 95%, greater than 100%, greater than 200%, greater than 300%, greater than 400%, greater than 500%, greater than 600%, greater than 700%, greater than 800%, greater than 900%, greater than 1000%, and/or some combination of the previously mentioned ranges (e.g., between 300 and 700%). Upon detection of a 3 MHz harmonic in S404 that exceeds the stored baseline power range of S403, or exceeds the stored baseline power range of S403 by the predetermined threshold amount, the 3 MHz detection filter and conversion logic 215 may output a confirmation signal to the 3 MHz detection microcontroller pin 230 and proceed to step S406.

In S406, the microcontroller 201 may perform in generally the same manner as corresponding S306 of process 300, where it may presumed that a nefarious actor is attempting to induce a fraudulent PLC signal on the trailer wiring harness 125. A warning may be provided to the driver via a dashboard illumination indication, electronic display indication, LED or other lamp or warning illumination, smartphone alert, playing a sound, and/or other audio or visual indications. In addition, the current location may be recorded and indexed in a server as a potential cyber-attack hotspot, and may also be transmitted with a report, a vehicle log, ECU log(s), driver and vehicle identification data, and the like, to a vehicle fleet manager, remote user, and/or a back-end server.

During S406, the microcontroller 201 may also take measures to prevent the suspected fraudulent PLC signals from being induced on the trailer wiring harness 125. The microcontroller 201 may, via a PLC blocking microcontroller pin 245, cause the nefarious PLC logic 225 to terminate all PLC communication transmitted via the designated PLC communication conductor (e.g., the seventh conductor). This may be accomplished by switching an AC filter, such as a low pass filter capacitor or a band stop filter capacitor, to become connected with the designated PLC communication conductor, thus shorting all AC signals or at least the 100 kHz-400 kHz AC signal frequencies on the designated PLC conductor (e.g., the seventh conductor) to ground. The switching of the AC filtering capacitor may be implemented by a discrete logic gate, a transistor, a relay, and the like. By using an AC filtering capacitor in this way rather than terminating the PLC designated conductor completely, for example, DC power may still be provided without disruption over the PLC link to provide auxiliary power to connected systems and devices.

In S407, the process 400 may wait for a predetermined time interval. In an embodiment the waiting period of S407 may wait one minute plus one minute multiplied by the number of cycles the AC filtering capacitor has remained switched on; i.e., [1 minute+(1 minute*number_of_cycles)]. For instance, on the first occasion that the AC filtering capacitor of the nefarious PLC logic 225 is switched, the process 300 may wait [1 minute+(1 minute*0 cycles)]=1 minute prior to retrying in step S408, where the AC filter may be removed by switching off the connection between the AC filtering capacitor and ground. In S409, it may determine whether the 3 MHz harmonic that exceeds the stored baseline power level of S402 still exists on the input conductor. If so, the process 400 may return to S406. In the subsequently repeated step S407, the "retry" waiting period may be defined by [1 minute+(1 minute*1 cycle)]=2 minutes, and so on.

If it is determined at S409 that the 3 MHz harmonic signal no longer exceeds the stored 3 MHz power level, or no longer exceeds the stored 3 MHz power level by the pre-determined threshold, the process 400 may proceed to S410 where the event details, such as the commercial vehicle's current location, a report, a vehicle PLC transaction log, ECU log(s), driver and vehicle identification data, and the like, may be stored in a memory storage of the microcontroller 201 and/or forwarded to a remote user and/or server.

It should be appreciated that process 400 may avoid performing step S406 and limiting, restricting, and/or disabling PLC communication when a 3 MHz harmonic signal is detected that exceeds the stored baseline power level when PLC communication is not occurring. This may be achieved in S403, which may monitor 3 MHz harmonics only during periods of PLC communication. If the 3 MHz harmonic that exceeds the stored baseline power level when no PLC communication is occurring, the process 400 may not proceed to S404 and subsequently to S406 where it may use the AC filter to limit, restrict, and/or disable PLC communication. This may be advantageous since it may be possible for 3 MHz harmonic signals to appear on the trailer wiring harness during normal, non-cyber-attack circumstances.

Figure 2B:
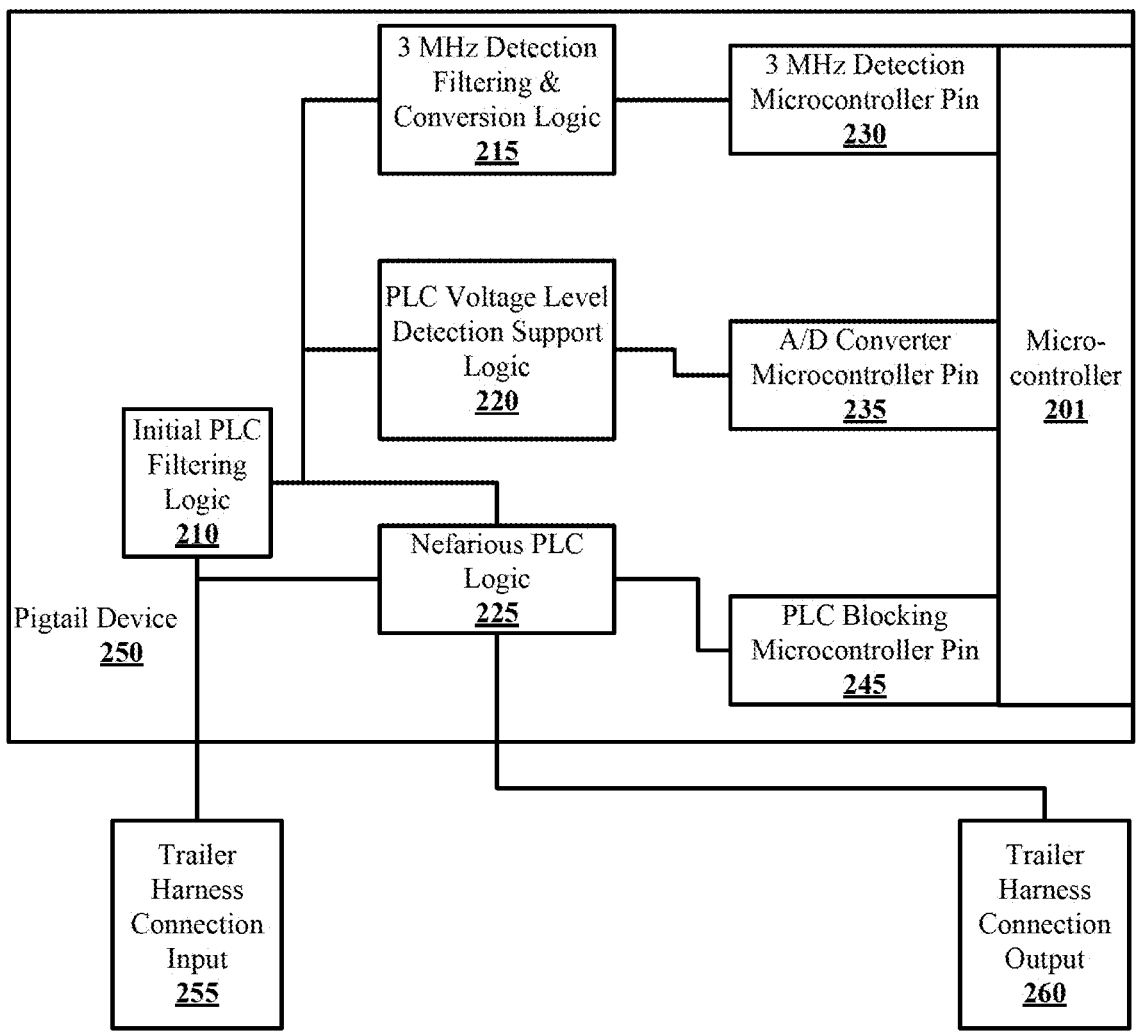
FIG. 2B is a block diagram of an example pigtail device in accordance with an embodiment of the present subject matter.

As discussed with reference to FIG. 2A, one or more of the commercial vehicle ECUs 105/110/115 may be provided with the electronic components and/or programming to facilitate the detection of cyber-attacks and to limit, restrict, and/or disable PLC communication when a suspected cyber-attack is occurring as previously described with reference to FIGS. 3 and 4. In a similar manner, these features may be achieved using a standalone pigtail device 250 as shown in FIG. 2B. The pigtail device 250 operates in a substantially similar manner as the vehicle ECU 200 and shares several components with the vehicle ECU 200, but with the following differences. Pigtail device 250 may be selectively coupled or hardwired to non-PLC conductors of the trailer wiring harness 125. The pigtail device 250 may be placed in-line with the trailer wiring harness 125, which may be convenient for simple plug-in installation and removal. As shown in FIG. 2B, the pigtail device 250 may be connected to the trailer wiring harness 125 at an input connection 255 and an output connection 260. When the nefarious PLC logic device 225 is not enabled to switch the AC filter into the designated PLC communication conductor, the pigtail device 250 may simply perform in a pass-through mode; substantially acting as an extension of the trailer wiring harness 125. On the other hand, when the nefarious PLC logic 225 is enabled to switch the AC filter and limit, restrict, and/or disable PLC communication, the pigtail device 250 may prevent AC PLC signals in the 100 kHz-400 kHz frequency band or even AC signals altogether from being propagated to any system or component downstream in the direction of the trailer harness connection output 260. Importantly, the trailer wiring harness 125 conductors input via the trailer harness connection input 255 may avoid the initial PLC filtering logic 210, unlike in the vehicle ECU 200, which may allow the DC voltage component to pass to the trailer harness output 260 through the nefarious PLC logic 225.

Figure 6:
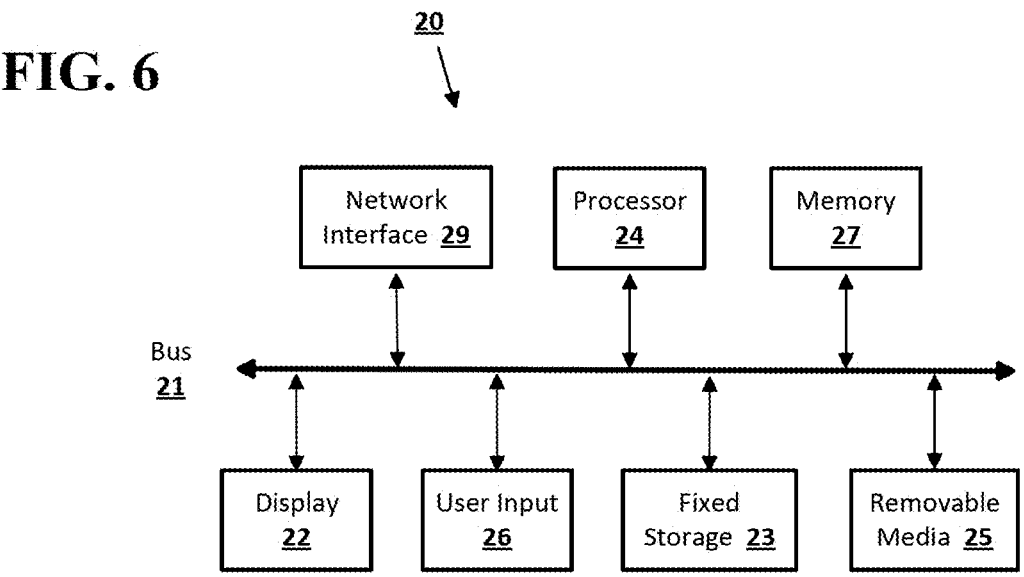
FIG. 6 is a computing device according to an embodiment of the disclosed subject matter.

Embodiments of the presently disclosed subject matter may be implemented in and used with a variety of component and network architectures. FIG. 6 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. The central processor 24 may form a microcontroller, such as the microcontroller 201 previously discussed. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium. In an embodiment, the bus 21 may be a Controller Area Network (CAN bus) disposed within the body of a vehicle.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
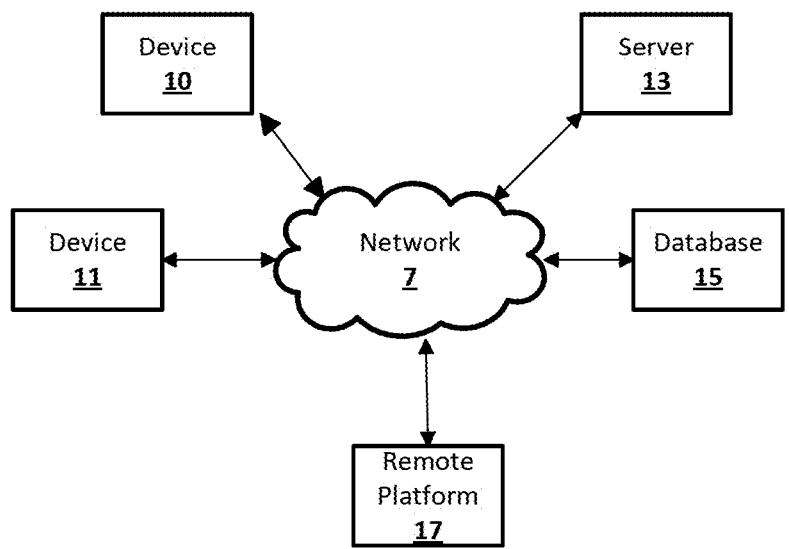
FIG. 7 shows a network configuration according to an embodiment of the disclosed subject matter.

FIG. 7 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, Controller Area Network (CAN bus) or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 8:
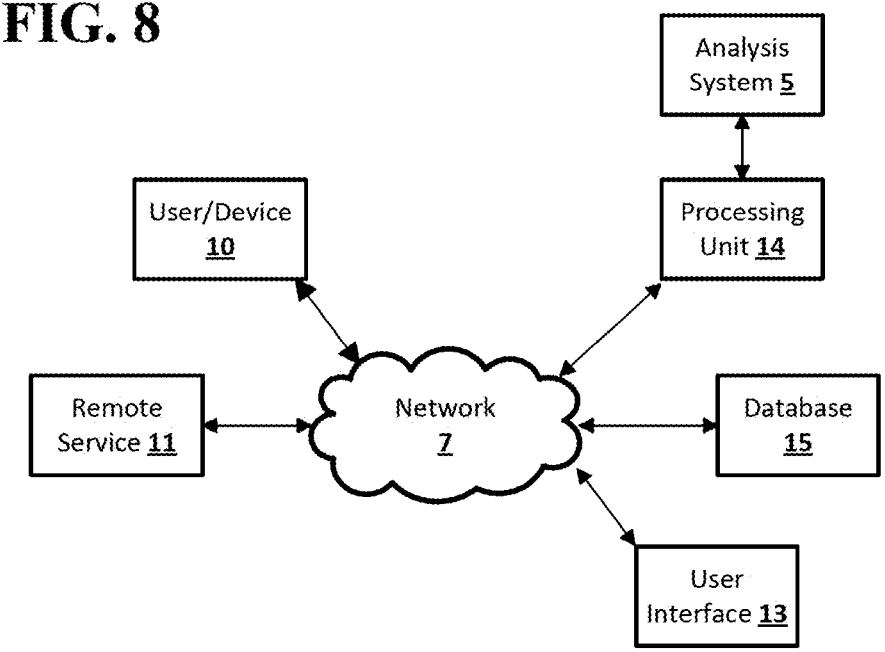
FIG. 8 shows an example network and system configuration according to an embodiment of the disclosed subject matter

FIG. 8 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing center 14 may be part of an integral system, or may include multiple computer systems communicating via a private network, the Internet, or any other suitable network. The processing center 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing center 14, database 15, and/or user interface 13. For example, the analysis system 5 may provide various prediction models, data analysis, or the like to one or more other systems.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk, or any other device capable of storing electronic information. The memory may store instructions adapted to be executed by the processor to perform the techniques according to embodiments of the disclosed subject matter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of detecting nefarious communication signals in a vehicle, comprising:
    measuring a characteristic of an alternating current (AC) signal during communication at a first time via a wiring harness of the vehicle;
    measuring the characteristic of the AC signal at a second time;
    determining that the characteristic measured during the first time differs from the characteristic measured during the second time; and
    coupling a filtering circuit via a switch to the wiring harness to filter a frequency band of a communication conductor of the wiring harness in response to the determination.

2. The method of claim 1, further comprising:
    delivering power to a plurality of electronic components of the vehicle via a direct current (DC) voltage component of a power signal; and
    filtering the DC voltage signal component from the power signal to produce the AC signal.

3. The method of claim 1, wherein
    the wiring harness is communicably coupled to a plurality of electronic control units (ECUs) of the vehicle.

4. The method of claim 1, further comprising:
    generating an audio or visual warning; and
    conveying the warning to a user of the vehicle in response to the determination.

5. The method of claim 1, wherein
    a power-line communication (PLC) signal of the vehicle is limited in response to the switching on of the filtering circuit.

6. The method of claim 1, wherein
the characteristic is a power level of a frequency band of the AC signal.

7. The method of claim 6, wherein
the frequency band is a first frequency band; and
the first frequency band of the AC signal is outside of a second frequency band in which the communication occurs.

8. The method of claim 1, wherein
the characteristic is an amplitude of the AC signal; and
the amplitude measured at the second time occurs on the wiring harness and is less than the amplitude measured at the first time.

9. The method of claim 1, wherein the determining the characteristic measured during the first time differs from the characteristic measured during the second time further comprises:
determining that the AC signal is present on a different conductor of the wiring harness during the second time than a conductor of the wiring harness in which the characteristic is measured during the first time.

10. The method of claim 1, wherein
the filtering circuit remains switched on for a calculated interval, wherein
the method further comprises:
switching the filtering circuit off upon expiration of the calculated interval.

11. A device for detecting nefarious communication signals in a vehicle, comprising:
a detection support logic;
a nefarious logic;
a filtering circuit; and
a microcontroller to:
receive a measurement signal from the detection support logic;
determine a characteristic of an alternating current (AC) signal during communication at a first time on a wiring harness of the vehicle based on the measurement signal;
determine the characteristic of the AC signal at a second time based on the measurement signal;
determine that the characteristic measured during the first time differs from the characteristic measured during the second time; and
transmit a blocking signal to the nefarious logic to filter a frequency band of a communication conductor of the wiring harness in response to the determination that the characteristic measured during the first time differs from the characteristic measured during the second time.

12. The device of claim 11, further comprising:
an initial filtering logic to filter a direct current (DC) voltage signal component from a power signal to produce the AC signal.

13. The device of claim 11, wherein
the wiring harness is communicably coupled to a plurality of electronic control units (ECUs) of the vehicle.

14. The device of claim 11, wherein the microcontroller is further configured to:
cause an audio or visual warning to be conveyed to a user of the vehicle in response to the determination that the characteristic measured during the first time differs from the characteristic measured during the second time.

15. The device of claim 11, wherein
a power-line communication (PLC) signal of the vehicle is limited in response to the filtering of the nefarious circuit.

16. The device of claim 11, wherein
the characteristic is a power level of a frequency band of the AC signal.

17. The device of claim 16, wherein
the frequency band is a first frequency band; and
the first frequency band of the AC signal is outside of a second frequency band in which the communication occurs.

18. The device of claim 11, wherein
the characteristic is an amplitude of the AC signal; and
the amplitude measured at the second time occurs on the wiring harness and is less than the amplitude measured at the first time.

19. The device of claim 11, wherein microcontroller is further configured to:
determine that the AC signal is present on a different conductor of the wiring harness during the second time than a conductor of the wiring harness in which the characteristic is measured during the first time.

20. The device of claim 11, wherein
the nefarious circuit filters the frequency band for a calculated interval, wherein
the microcontroller is further configured to:
transmit an unblocking signal to the nefarious circuit to stop filtering the frequency band upon expiration of the calculated interval.

* * * * *